United States Patent [19]

Ruether

[11] 3,742,151

[45] June 26, 1973

[54] COMMUNICATION CALL HOLDING AND SUPERVISING CIRCUIT

[75] Inventor: Peter Gade Ruether, Denver, Colo.

[73] Assignee: Bell Telephone Laboratories, Incorporated, Murray Hill, N.J.

[22] Filed: Dec. 20, 1971

[21] Appl. No.: 209,658

[52] U.S. Cl. .................................................. 179/99
[51] Int. Cl. ............................................ H04m 3/22
[58] Field of Search ..................... 179/99, 1, 18 DA, 179/18 FA

[56] References Cited

UNITED STATES PATENTS

| | | | |
|---|---|---|---|
| 3,420,963 | 1/1969 | Abbott et al. | 179/99 |
| 3,395,256 | 7/1968 | Limiero et al. | 179/99 |
| 3,410,961 | 11/1968 | Slana | 179/18 |

*Primary Examiner*—Kathleen H. Claffy
*Assistant Examiner*—Kenneth D. Baugh
*Attorney*—W. L. Keefauver

[57] ABSTRACT

An electronic call holding circuit including a PNPN switch and an NPN transistor in a constant current configuration across a telephone line is disclosed. A pair of photoresistive devices isolate the line from logic control circuitry and provide for the coupling of hold commands to the PNPN switch and for the detection of call supervisory signals on the line following the application of a constant current variable impedance hold condition across the line.

17 Claims, 1 Drawing Figure

PATENTED JUN 26 1973 3,742,151
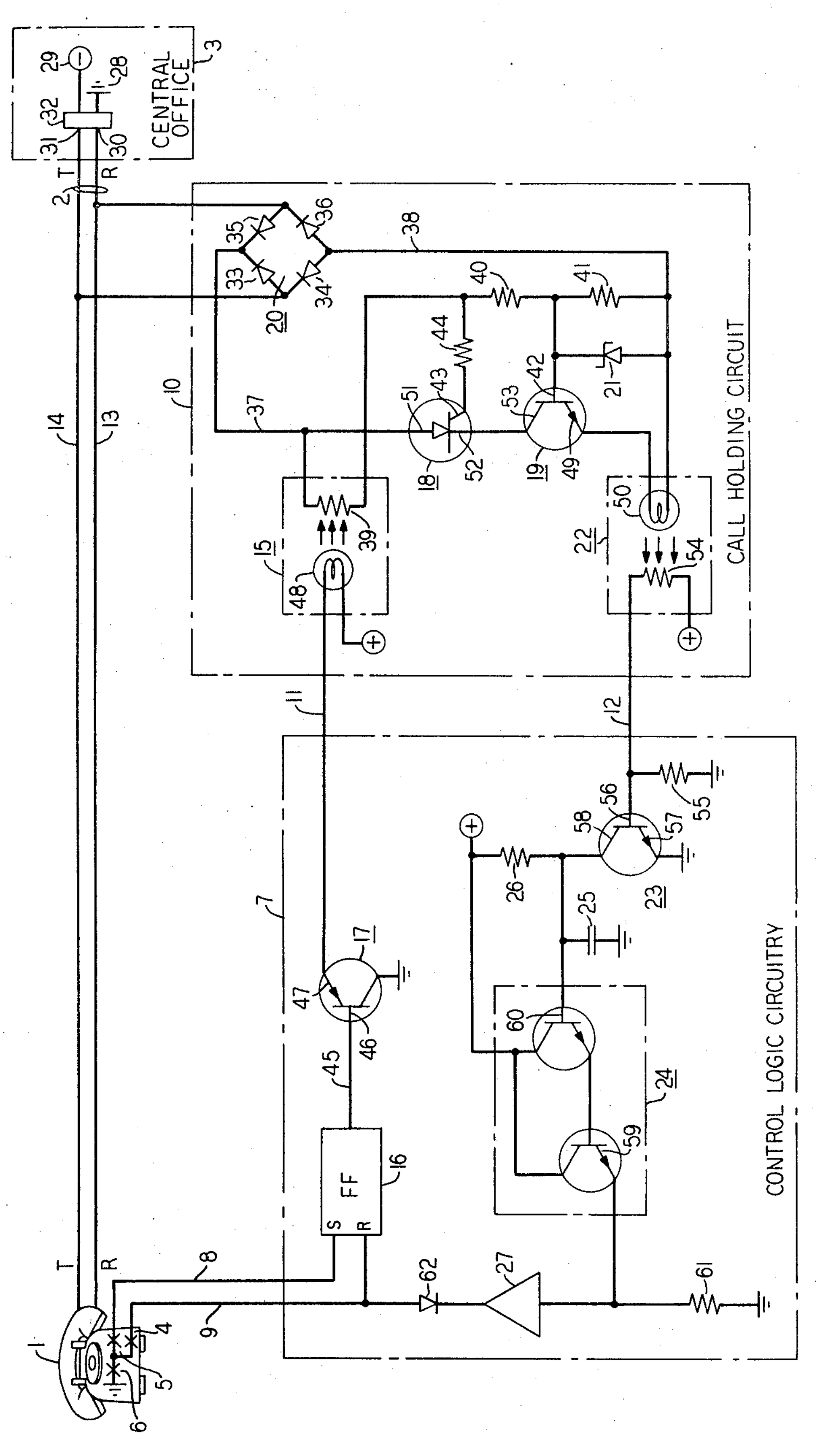

COMMUNICATION CALL HOLDING AND SUPERVISING CIRCUIT

BACKGROUND OF THE INVENTION

This invention relates to communication call holding arrangements and particularly to key telephone circuitry utilizing constant current and photoresistive devices for holding and supervising calls.

Telephone companies offer a multitude of circuits for key telephone stations which enable customers to place a call on hold while communications over an associated telephone line to another customer are temporarily interrupted. Such a circuit is typically activated in response to a customer depression of a hold key of the telephone set for switching a low impedance termination across the customer line whereby connections through a switching network to a distant station are held or maintained in a well-known manner. While the connections are being held, the continuance of the held call is usually supervised by monitoring a flow of current over the customer line. The hold condition is subsequently withdrawn in response to either an interruption in the line current following a disconnection by the distant station or an "off-hook" signal from the local telephone when call conversation is to be resumed.

A substantial percentage of the call holding circuits used in present day systems are electromechanical relay arrangements. Although such circuits furnish reliable and efficient call holding service, their operational speed is relatively slow in comparison to electronic circuit speeds. In addition, their physical size requires that they be located outside of a key telephone set at a remote location and with appropriate multiconductor cabling for interconnection of the key telephone and the holding circuit.

The art has progressed to the extent that electronic call holding circuits are currently available for advantageously cooperating with the electromechanical and high speed electronic switching systems. The electronic holding circuits have proven to be physically smaller than prior art relay designs, and therefore, more practical for actual integration into a key telephone set. Despite the foregoing advantages and others, electronic holding circuits have proven to be more susceptible than relay holding arrangements to undesired operations due to noise and transient signals coupled from customer lines to electronic hold controlling circuits. Such undesired operations include, for example, the premature initiation or withdrawal of a call holding condition.

A fundamental deficiency in prior art electromechanical and electronic call holding circuits is that substantial margins in sensitivity and power dissipation must be provided in apparatus components so that they reliably operate on long and short customer lines as well as with high and low variations in central office voltages. The lengths of customer lines and central office voltage variations affect the magnitude of the line current flow and voltage drops within a call holding circuit during the holding of call connections. Illustratively, a substantial line current flows during the holding of connections on a short customer line in contrast with a long customer line and particularly when the central office voltage varies to its highest extreme. As a result, the call holding circuit associated with such a short customer line generally is required to dissipate substantially more power than when connected to a relatively long customer line with a low central office voltage.

In view of the foregoing, it is apparent that a need exists for circuitry which controls the magnitude of line current flow on short and long customer lines during call holding operations and which improves noise and transient signal isolation for call holding control circuitry.

SUMMARY OF THE INVENTION

The foregoing deficiency and needs are fulfilled in accordance with a specific illustrative embodiment of my inventioin in which a PNPN transistor switch and an NPN transistor amplifier cooperate with a pair of photoresistive devices to provide a variable impedance constant current flow on a key telephone line for holding call connections and for concurrently supervising the continuance of the call. The photoresistive devices provide very high impedances for isolating noise and transient signals on the telephone line from logic circuitry associated with a key telephone for controlling both the application and withdrawal of a hold condition on the line and the supervision of a held call.

According to one aspect of my illustrative embodiment, the logic control circuitry includes a hold flip-flop which is activated in response to a depression of a hold key of a telephone set for operating a first one of the photoresistive devices via a transistor driver and to initiate the application of a hold condition across the telephone line. Upon operating, the first photoresistive device switches the NPN transistor amplifier and a PNPN switch to a high conduction controlled variable impedance state across tip and ring conductors of a telephone line. The NPN transistor is biased with a voltage divider network including a Zener diode to regulate the magnitude of line current flow through the PNPN switch and the telephone line so that the current is substantially constant despite whether the holding circuit is connected to a short or long telephone line and despite variations in central office voltages.

Another aspect of my invention is that a second one of the photoresistive devices is connected in series with the NPN transistor and the PNPN switch across the line and advantageously is activated by the constant line current flow to provide call supervision during the holding of call connections. The second photoresistive device cooperates with a transistor timer in the logic control circuit to detect call disconnect, noise and other transient signals on the line during call supervision. Upon detecting such a signal, the photoresistive device activates the timer to generate a time interval. Noise and transient signals typically are of short duration and are terminated within that time interval. Valid disconnect signals from a distant station, however, persist for longer than the time interval. Accordingly, the timer is activated at the end of the time interval in response to a valid disconnect signal for generating an output signal which resets the hold flip-flop incident to a withdrawal of the hold condition across the telephone line. It is a feature of my illustrative holding circuit that the latter flip-flop is also reset when the hold condition is to be withdrawn following a removal of the local key telephone set from its switchhook for continuing call conversation.

DRAWING DESCRIPTION

This invention, together with its various objects and features, can be easily understood from the following more detailed description of a specific illustrative embodiment taken in conjunction with the accompanying single sheet of a schematic and block diagram drawing of the exemplary electronic call holding circuit cooperating with facilities of a single key telephone set and customer line.

DETAILED DESCRIPTION

In the drawing, there is shown a key telephone station 1 connected to a telephone line 2 extending to a central office 3. Telephone 1 is conventionally equipped with a line pickup key 4 as well as a holding key 5 and switchhook contacts 6 for activating, in accordance with my invention, a logic control circuit 7 over conductors 8 and 9. Circuit 7 controls a call holding circuit 10 over conductors 11 and 12 for applying and withdrawing a controllable impedance across tip and ring conductors 13 and 14 of line 2. According to a feature of my invention, a photoresistive device 15 senses call hold initiating signals generated by a hold flip-flop 16 and transistor 17 of circuit 7 in response to a call hold request received over conductor 8 from telephone 1.

Upon sensing such a call hold signal, the photoresistive device 15 activates a PNPN transistor switch 18 and an NPN transistor 19 to a controllable impedance, high conduction state across line 2 via a diode bridge 20 whereby a call on line 2 is placed in a hold condition.

According to another feature of my invention, transistor 19 cooperates with a voltage divider network including a Zener diode 21 and photoresistive device 15 for generating the controllable impedance so that a substantially constant current flows in line 2 for holding call connections. Advantageously, my illustrative embodiment provides for the supervision over the continuance of the held call as well as the removal of a hold condition by incorporating another photoresistive device 22 in a series arrangement with transistor 19. Photoresistive device 22 in performing the supervision activates a transistor 23 which controls a timer arrangement including a Darlington transistor configuration 24, a capacitor 25 and resistor 26. The timer generates a time delay interval within which transient signals produced, for example, as a result of lightning, are not recognized as valid call disconnect signals. Those signals which persist longer than the delay interval are recognized as valid hold removal or distant station generated call disconnect signals. Following the delay interval, transistor 24 activates a monopulser 27 for generating a reset pulse for flip-flop 16 to effect a removal of a call holding condition on line 2. Flip-flop 16 is also resettable for removing a hold condition in response to a ground signal generated on conductor 9 via switchhook and pickup key contacts 6 and 4 incident to the continuance of call conversation at the local telephone 1.

Conventional operating power for telephone 1 and for the call holding and supervising functions is supplied from the central office 3 by ground and battery potentials 28 and 29 extended via the upper and lower windings 30 and 31 of the line supervisory relay 32 to the tip and ring conductors 13 and 14 of line 2. Adjunct power for the operation of the photoresistive devices 15 and 22 and the transistors 23 and 24 is illustratively supplied by a +5 volt source.

Holding circuit 10 comprises a bridge rectifier 20 including diodes 33, 34, 35 and 36 as a protection guard against reversals of the potentials 28 and 29 on line 2. Such reversals can occur during initial circuit installations, lightning surges and supervisory signaling in certain switching systems. The rectified potentials provided at conductors 37 and 38 are used to bias and operate transistors 18 and 19, and the photoresistive devices 15 and 22 for call holding and supervising.

Each of the photoresistive devices 15 and 22 comprises a respective resistance element 39 and 54 which is light coupled to a respective lamp 48 and 50. In a quiescent state when a call hold condition is not in effect on line 2, lamps 48 and 50 are nonenergized and nonilluminated for defining high impedance states for the associated light sensitive resistance elements 39 and 54. The high impedance state of each of the elements 39 and 54 is illustratively several megohms. When lamp 48 or 50 is energized, as hereinafter explained, it emits light which is coupled to its associated resistance element 39 or 54 for altering its resistance from the high impedance state to a low impedance state illustratively of approximately 150 ohms. Advantageously, the high impedance of the devices 15 and 22 provides for effective isolation of noise and high voltage transients on line 2 from the logic control circuit 7.

Bias potentials for transistors 18 and 19 are derived by a voltage divider network connected across the conductors 37 and 38 and which network comprises a resistor element 39 of the photoresistive device 15 and the resistors 40 and 41. During a quiescent state, when a call hold condition is not in effect on line 2, transistors 18 and 19 are reversed bias to their high impedance, low conduction states under control of the resistance element 39. Illustratively, the latter resistance is several megohms during the time that the lamp element 39 of photoresistive device 15 is not activated and that high resistance is used for developing substantially the negative potential on conductor 38 at a base electrode 42 of transistor 19 and at a gate electrode 43 of transistor 18 via a resistor 44.

When either an outgoing or incoming call is present on line 2, phone 1 has its handset off its switch-hook to define its "off-hook state" and thereby exhibit an "off-hook" resistance between conductors 13 and 14. The latter resistance typically includes that of a transmitter and coils (not shown) of the telephone 1. Illustratively, when phone 1 is "off-hook" on a call, it completes a circuit for the operation of the supervisory relay 32, which indicates in office 3 the presence of a call on line 2. The circuit extends from potential 28 through the winding 30, conductor 13, the off-hook resistance of phone 1, conductor 14, and the winding 31 to the negative potential 29.

During such a call, a person at station 1 can initiate the holding of that call by momentarily depressing the hold key 5. The latter action causes a ground signal to be applied through contacts 6 and 5 over conductor 8 to a set input of hold flip-flop 16 for switching it to produce an output signal on conductor 45 that forward biases the base-emitter electrodes 46 and 47 of the emitter-follower amplifier transistor 17. As a result, current is drawn through lamp 48 of the photoresistive device 15 for switching the resistance of its resistor element 39 illustratively from several megohms to approximately 150 ohms. The resistance change alters the voltage division across the resistors 40 and 41 to the extent that transistors 18 and 19 are switched to their low impedance, high conduction states for applying a hold impedance across the tip and ring conductors 13 and 14 of line 2.

Transistor 19 advantageously comprises a constant current generator with the bias for its base electrode 42 controlled by a Zener diode 21 in parallel with resistor 41 of the voltage divider network including resistors 40 and 39. Diode 21 limits the voltage at the base electrode 42 illustratively to 3 volts. Consequently, when resistor 39 changes to its low hold resistance as already explained, transistor 19 draws base current through resistors 40 and 39 via an emitter electrode 49 and, in turn, from conductor 38 through a lamp 50 of a photoresistive device 22 and the emitter-collector electrodes 49 and 53 of transistor 19.

Concurrently, the resistance change of resistor 39 applies substantially the voltage on conductor 37 via resistor 44 to the gate electrode 43 of transistor 18 for switching it to its low impedance, high conduction state through its anode-cathode electrodes 51 and 52. As a result, a low impedance for holding a call on line 2 is applied across conductors 37 and 38 via the anode-cathode electrodes 51 and 52 of transistor 18, collector-emitter electrodes 53 and 49 of transistor 19 and in series with lamp 50. The low impedance is connected to line 2 via the forward biased ones of diodes 33–36 and provides an obvious path for maintaining relay 32 operated to hold call connections through office 3 to a distant station.

According to my invention, two advantageous functions are performed during the holding of a call on line 2. A first is the application of a constant holding current on line 2 under control of transistor 19 and despite the resistance of line 2 and the variations of potentials 28 and 29. Transistor 19 maintains the constant current by having the voltage at its base electrode 42 fixed by the Zener diode 21 and by sensing at emitter 49 any changes in the voltage on line 2 and then reflecting corresponding impedance changes in the emitter-collector junction of transistor 19 for automatically maintaining the constant current flow in the already described call holding path across line 2.

A second function is the supervision of the held call by means of the photoresistive device 22 in combination with the control logic circuit 7. The incorporation of the photoresistive lamp 50 in the emitter 49 of transistor 16, according to my invention, advantageously provides for the supervision of a call during a holding condition and for the removal of the hold on line 2 when a call disconnect signal is received from central office 3 via line 2. Photoresistive device 22 is essentially a sensor which includes a resistor element 54 that illustratively exhibits several megohms when lamp 50 is not energized by a call holding current flowing in line 2. Resistor 54 is included in a call disconnect detector which comprises the transistor 23. In its high resistance state, resistor 54, in cooperation with a voltage divider resistor 55, reverse biases the base-emitter electrodes 56 and 57 of transistor 23. The resultant output of collector electrode 58 of transistor 23 enables the effective emitter-base electrodes 59 and 60 of the Darlington pair of NPN transistors to be forward biased via resistor 61 in response to a sufficient charging of capacitor 25 through resistor 26. The forward biased pair of transistors 24 produces an output signal for activating a monopulser 27 to produce a signal for resetting a hold flip-flop 16, as hereinafter explained, with respect to the removal of a call hold condition.

When call holding current is drawn through lamp 50, as priorly explained, the resistance of resistor 54 switches illustratively from several megohms to approximately 150 ohms. The low resistance forward biases the base-emitter electrodes 56 and 57 of transistor 23 and switches its collector 58 to slightly above-ground potential. As a result, the effective emitter-base 59 and 60 of the Darlington pair of NPN transistors 24 are reverse biased and its emitter output switches to ground potential for enabling the monopulser 27 to recycle. The detector rests in this state to supervise by means of lamp 50 the continuance of held call on line 2.

The removal of a call hold condition on line 2 is initiated when, in a well-known manner, either the phone 1 is reconnected to line 2 by the operation of pickup key 4 for resuming call conversation or by the discontinuation of a call in the central office 3 by the momentary disconnection of potentials 28 and/or 29 from line 2 upon a call disconnect by a distant calling or called station (not shown). A hold condition is removed by resetting the hold flip-flop 16. Such a resetting is accomplished by the application of a reset signal to the reset input of flip-flop 16 from either telephone 1 or the monopulser amplifier 27. A reset pulse is received from phone 1 via conductor 9, contacts 4 and 6 of the telephone set 1 upon a conventional actuation of a line pickup key and the removal of the telephone handset to its "off-hook" state. The circumstances under which a reset pulse is applied to flip-flop 16 by monopulser 27 are described hereinafter in connection with a central office disconnection of potentials 28 and/or 29 following a distant station termination of a call.

In resetting, flip-flop 16 switches its output to a potential that reverse biases transistors 17 and deenergizes lamp 48 of the photoresistive device 15. Consequently, its resistor 39 changes in value illustratively from approximately 150 ohms to several megohms. The resistance change substantially reduces current flow from the emitter-base electrodes 49 and 42 of transistor 19 and thereby reverse biases transistor 19 for switching transistor 18 into its high impedance, low conduction state across conductors 37 and 38. Thus, the hold impedance is removed from line 2. Concurrently, the resistance of resistor 54 in photoresistive device 22 also changes illustratively from 150 ohms to several megohms for reducing the base current of the amplifier transistor 23 and thereby switching it to its reverse biased state.

In response to the latter action, capacitor 25 begins charging for a time delay interval and through resistor 26 toward +5 volts. The delay interval is used for protecting against premature release of a call hold condition due to a transient which may be caused, for example, by lightning surges induced on line 2 while a call is being held. At the end of the delay interval, capacitor 25 is sufficiently charged to forward bias the effective base-emitter electrodes 60 and 59 of transistors 24 for generating a positive signal at its emitter output. The latter signal activates monopulser 27 for again resetting flip-flop 16 and insuring that transistor 17 is switched to its reverse biased condition as already explained.

Turning now to the removal of a hold condition in response to a disconnection of potentials 28 and/or 29 from line 2 in response to a distant station call disconnect, the potential disconnection causes the release of relay 32 and also is reflected as a voltage removal from conductors 37 and 38 and thereby causes transistors 18 and 19 to switch to their high impedance, low conduction state for removing the hold condition on line 2. As a result, the lamp 50 of photoresistive device 22 causes its resistor 54 to switch from approximately 150 ohms to several megohms for reverse biasing transistor 23, as priorly described. Capacitor 25 then charges for a time delay interval via a resistor 26 and, upon reaching a prescribed voltage, causes transistors 24 to be forward biased for producing an output signal that drives monopulser 27 to generate on output pulse which is coupled through isolating diode 62 for resetting flip-flop 16. A resetting of flip-flop 16 switches the signal at its output so that transistor 17 is reverse biased to deactivate lamp 48 of the photoresistive device 15, and thereby changing its resistor 39 to several megohms for ensuring that transistors 18 and 19 remain in their reverse biased state.

It is to be understood that the above-described arrangement is illustrative of the principles of the invention. Numerous other arrangements may be devised by those skilled in the art without departing from the spirit and scope of the invention.

What is claimed is:

1. A circuit for holding a call on a communication line comprising a constant current transistor circuit arrangement for applying a controllable electrical impedance across said line to hold a call on said line, a transistor switch responsive to a receipt of a hold request signal for connecting said transistor circuit arrangement to said line for applying said controllable impedance to said line, means electrically biasing said transistor circuit arrangement, said biasing means including a Zener diode and voltage divider network for cooperating with electrical signals on said line for controlling said impedance to regulate a constant magnitude of current flow on said line for call holding, said voltage divider network including a photoresistive device having a resistor element serially connected with said Zener diode, and means light coupled to said resistor element and being responsive to a receipt of a hold request signal, said Zener diode providing a fixed voltage for biasing said transistor circuit arrangement.

2. The invention defined in claim 1 further comprising means responsive to a receipt of a call hold initiating signal for activating said light coupled means to alter the resistance of said resistance element for effecting the application of said fixed voltage to bias said constant current transistor circuit arrangement.

3. The invention defined in claim 2 wherein said activating means includes a bistable flip-flop responsive to a receipt of a call hold initiating signal from a telephone set for supplying an output signal, and, amplifier means responsive to said output signal for applying a hold request signal to activate said light coupled means.

4. The invention defined in claim 1 wherein said constant current transistor circuit arrangement includes means for sensing call supervisory signals on said line.

5. The invention defined in claim 4 wherein said sensing means includes a photoresistive device having a resistor element and means light coupled to said element and being responsive to supervisory signals on said line for altering the resistance of said resistor element, and circuitry responsive to said resistance altering for sensing supervisory signals on said line.

6. The invention defined in claim 5 wherein said supervisory signals include a call disconnect signal, said sensing circuitry includes means responsive to said resistance altering for detecting a call disconnect signal, means controlled by said detecting means for defining a timed interval, and means operated by said defining means at the expiration of said interval for generating an electrical signal to control said transistor switch for effecting a disconnection of said constant current transistor circuit arrangement from said line.

7. The invention defined in claim 6 wherein said generating means includes a monopulser amplifer operable for generating an electrical pulse signal, said defining means includes a transistor timing circuit activatable for operating said monopulser amplifier, and said detecting means includes a transistor amplifier responsive to a prescribed altering of the resistance of said resistor element for activating said transistor timing circuit.

8. An electronic call holding circuit for a communication line having first and second conductors and comprising a transistor switch, a transistor arrangement for applying an electrical holding condition across said conductors, a first photoresistive device responsive to a receipt of a hold signal for operating said transistor switch and said transistor arrangement, and a second photoresistive device controlled by said electrical holding condition for detecting call supervisory signals on said line, said transistor arrangement including means including said second photoresistive device for supplying a constant current controllable impedance across said conductors for call holding on said line.

9. The invention defined in claim 8 wherein said second photoresistive device includes a resistor element and lamp means light coupled to said element for altering the resistance of said element, and said supplying means includes a constant current amplifier including a transistor having an emitter electrode serially connected with said lamp means and one of said line conductors.

10. The invention defined in claim 9 wherein said constant current amplifier transistor includes a base electrode, said amplifier further including a Zener diode and a voltage divider network for supplying a fixed voltage to said base electrode for call holding on said line.

11. The invention defined in claim 10 wherein said first photoresistive device includes a lamp element responsive to a receipt of a hold signal for emitting light signals and a resistor means connected in said voltage divider network and responsive to the emitted light signals for changing its resistance to control said Zener diode to supply said fixed voltage to said base electrode.

12. The invention defined in claim 11 wherein said constant current amplifier transistor further includes a collector electrode, and said transistor switch includes a PNPN transistor having a cathode electrode connected to said collector electrode, an anode electrode connected to a second one of said line conductors, and a gate electrode connected to said voltage divider network and responsive to a resistance change of said resistor means for activating said PNPN transistor electrically to connect said collector electrode through said cathode and anode electrodes to said second one of said line conductors.

13. The invention defined in claim 12 further comprising means operable for energizing said lamp element to emit said light signals, and a bistable device responsive to a receipt of a hold initiating signal from a telephone set for operating said energizing means.

14. The invention defined in claim 13 further comprising means defining a timed interval for a valid call hold removal signal, and an amplifier activated by an alteration of said resistance of said resistor element in response to a call hold removal signal on said line.

15. The invention defined in claim 14 further comprising means activated by said defining means for generating a reset signal for said bistable device to effect a release of said energizing means and a deactivation of said transistor switch, and said bistable device selectively responsive to a receipt of a reset signal from said generating means and a hold removal signal from said telephone set for controlling said bistable device to effect a release of said energizing means.

16. An electronic call holding circuit for a communication line having a pair of conductors and comprising a transistor for establishing a hold condition across the conductors, a control arrangement for detecting control signals for applying and removing the hold condition, a semiconductor gate connected in series with said transistor for operating said transistor, and a voltage divider arrangement including a photoresistance light coupled to said control arrangement for operating said semiconductor gate and biasing said transistor to regulate a constant magnitude of current on the line.

17. An electronic call holding circuit in accordance with claim 16 further comprising a light emitting element in series with said transistor and light coupled to said control arrangement for applying disconnect signals from the line to said control arrangement.

* * * * *